(12) United States Patent
Godaliyadda et al.

(10) Patent No.: US 12,659,593 B2
(45) Date of Patent: *Jun. 16, 2026

(54) METHOD AND APPARATUS FOR AUTOMATIC EXPOSURE

(71) Applicant: Texas Instruments Incorporated, Dallas, TX (US)

(72) Inventors: Gunawath Dilshan Godaliyadda, Allen, TX (US); Mayank Mangla, Allen, TX (US); Gang Hua, Katy, TX (US)

(73) Assignee: Texas Instruments Incorporated, Dallas, TX (US)

( * ) Notice: Subject to any disclaimer, the term of this patent is extended or adjusted under 35 U.S.C. 154(b) by 156 days.

This patent is subject to a terminal disclaimer.

(21) Appl. No.: 18/584,349

(22) Filed: Feb. 22, 2024

(65) Prior Publication Data

US 2024/0196098 A1 Jun. 13, 2024

Related U.S. Application Data

(63) Continuation of application No. 17/491,382, filed on Sep. 30, 2021, now Pat. No. 11,943,540.

(51) Int. Cl.
*H04N 23/71* (2023.01)
*H04N 23/73* (2023.01)

(52) U.S. Cl.
CPC ............. *H04N 23/71* (2023.01); *H04N 23/73* (2023.01)

(58) Field of Classification Search
CPC ......... H04N 23/71; H04N 23/73; H04N 23/72
See application file for complete search history.

(56) References Cited

U.S. PATENT DOCUMENTS

| | | | | |
|---|---|---|---|---|
| 9,402,034 | B2 * | 7/2016 | Price | H04N 23/71 |
| 9,402,035 | B2 * | 7/2016 | Benderius | G03B 7/00 |
| 10,666,873 | B2 * | 5/2020 | Bouzaraa | G06F 18/2413 |
| 11,057,573 | B2 * | 7/2021 | Dabral | H04N 5/265 |
| 2005/0057666 | A1 | 3/2005 | Hu et al. | |
| 2009/0160968 | A1 * | 6/2009 | Prentice | H04N 23/667 |
| | | | | 348/222.1 |
| 2013/0027581 | A1 | 1/2013 | Price et al. | |
| 2014/0168486 | A1 | 6/2014 | Geiss | |

(Continued)

FOREIGN PATENT DOCUMENTS

WO 2017125779 A1 7/2017

OTHER PUBLICATIONS

T Li, Y. Song, and T. Mei, "An Auto Exposure Control Algorithm based on Lane Recognition for on-board Camera", 2015 IEEE Intelligent Vehicles Symposium (IV), Jun. 28-Jul. 1, 2015, COEX, Seoul, Korea, pp. 851-856.

(Continued)

*Primary Examiner* — Ahmed A Berhan
(74) *Attorney, Agent, or Firm* — Michelle F. Murray; Frank D. Cimino

(57) ABSTRACT

A method for automatic exposure (AE) control is provided that includes receiving statistics for AE control for an image from an image signal processor (ISP) coupled to an image sensor generating the image, computing an exposure value at a current time t (EV(t)) using a cost function based on target characteristics of an image, wherein computation of the cost function uses the statistics, and computing AE settings for the image sensor based on EV(t).

20 Claims, 4 Drawing Sheets

(56) References Cited

U.S. PATENT DOCUMENTS

| | | |
|---|---|---|
| 2014/0362927 A1 | 12/2014 | Chung et al. |
| 2015/0312460 A1 | 10/2015 | Benderius |
| 2018/0241929 A1 | 8/2018 | Bouzaraa et al. |
| 2019/0191106 A1 | 6/2019 | Dabral et al. |

OTHER PUBLICATIONS

J. Liang, Y. Qin, and Z. Hong, "An Auto-exposure Algorithm for Detecting High Contrast Lighting Conditions", 2007 7th International Conference on ASIC, Oct. 22-25, 2007, Guilin, China, pp. 725-728.
S. Schulz, M. Grimm, and R.R. Grigat, "Using Brightness Histogram to perform Optimum Auto Exposure", WSEAS Transactions on Systems and Control, vol. 2, Issue 2, Feb. 2007, pp. 93-100.
T. Jiang et al., "Multiple templates auto exposure control based on luminance histogram for on-board camera", 2011 IEEE International Conference on Computer Science and Automation Engineering, vol. 3, Jun. 10-12, 2011, Shanghai, China, pp. 237-241.
Y. Piao and W. Xu, "Method of Auto Multi-Exposure for High Dynamic Range Imaging", 2010 International Conference on Computer, Mechatronics, Control and Electronic Engineering (CMCE), vol. 6, Aug. 24-26, 2010, Changchun, China, pp. 93-97.
A. Gooben et al., "Auto Exposure Control for Multiple-Slope Cameras", Proceedings of 5th International Conference Image Analysis and Recognition, Jun. 25-27, 2008, Povoa de Varzim, Portugal, pp. 305-314.
"TDA4VM Jacinto Processors for ADAS and Autonomous Vehicles Silicon Revisions 1.0 and 1.1", TDA4VM-Q1, TDA4VM, Texas Instruments Incorporated, Feb. 2019, revised Aug. 2021, pp. 1-323.
European Search Report for European Application 22199305.8, Feb. 23, 2023, 14 pages.

* cited by examiner

METHOD AND APPARATUS FOR AUTOMATIC EXPOSURE

CROSS-REFERENCE TO RELATED APPLICATIONS

This application is a continuation of and claims priority to U.S. patent application Ser. No. 17/491,382, filed Sep. 30, 2021, which is hereby incorporated herein by reference in its entirety.

BACKGROUND

Exposure is an important contributor to the quality of images captured by an imaging sensor system, e.g., a camera. If regions of an image are over-exposed or under-exposed, details may be lost and colors may be washed out. In real-time vision-based systems, e.g., advanced driver assistance systems, industrial imaging, and security systems, captured images are provided as direct input to computer vision algorithms, and the quality of the images affects the success of these algorithms. Many imaging sensor systems provide an automatic exposure (AE) mode that automatically calculates and adjusts exposure settings. However, current approaches to AE may not correct an entire image properly.

SUMMARY

Embodiments of the present disclosure relate to automatic exposure in an imaging sensor system. In one aspect, a method for automatic exposure (AE) control is provided that includes receiving statistics for AE control for an image from an image signal processor (ISP) coupled to an image sensor generating the image, computing an exposure value at a current time t (EV(t)) using a cost function based on target characteristics of an image, wherein computation of the cost function uses the statistics, and computing AE settings for the image sensor based on EV(t).

In one aspect, a system-on-a-chip (SoC) is provided that includes an image signal processor (ISP) configured to generate statistics for automatic exposure (AE) control from an image captured by an image sensor coupled to the ISP, a memory configured to store software instructions implementing automatic exposure (AE) control, the software instructions including software instructions that compute an exposure value at a current time t (EV(t)) using a cost function based on target characteristics of an image, wherein computation of the cost function uses the statistics and software instructions to compute AE settings for the image sensor based on EV(t), and at least one processor coupled to the memory to execute the software instructions.

In one aspect, a method for learning weights of a cost function for automatic exposure (AE) control, the method including receiving parameters in a weight learning component coupled to a virtual imaging system, the parameters including a range of candidate weight values, a set of starting exposure values (EVs), and a number of time steps n to execute an experiment, executing a plurality of experiments on the virtual imaging system for a plurality of scenes stored in a scene database coupled to the virtual imaging system using differing combinations of candidate sets of weight values selected from the range of candidate weight values and starting EVs selected from the set of starting EVs, wherein an experiment includes computing n EVs for a scene using a candidate set of weight values and a starting EV, wherein the scene includes a plurality of images, and computing, by the weight learning component, quality metrics for each candidate set of weight values based on the n EVs computed for each experiment of the plurality of experiments executed using the candidate set of weight values.

In one aspect, a computer system is provided that includes a processor, and a memory storing software instructions that, when executed by the processor, cause computation of quality metrics for automatic exposure (AE) control, the software instructions including software instructions to receive parameters in a weight learning component coupled to a virtual imaging system, the parameters including a range of candidate weight values, a set of starting exposure values (EVs), and a number of time steps n to execute an experiment, execute a plurality of experiments on the virtual imaging system for a plurality of scenes stored in a scene database coupled to the virtual imaging system using differing combinations of candidate sets of weight values selected from the range of candidate weight values and starting EVs selected from the set of starting EVs, wherein an experiment includes computing n EVs for a scene using a candidate set of weight values and a starting EV, wherein the scene includes a plurality of images, and compute, by the weight learning component, quality metrics for each candidate set of weight values based on the n EVs computed for each experiment of the plurality of experiments executed using the candidate set of weight values.

DETAILED DESCRIPTION

Figure 1:
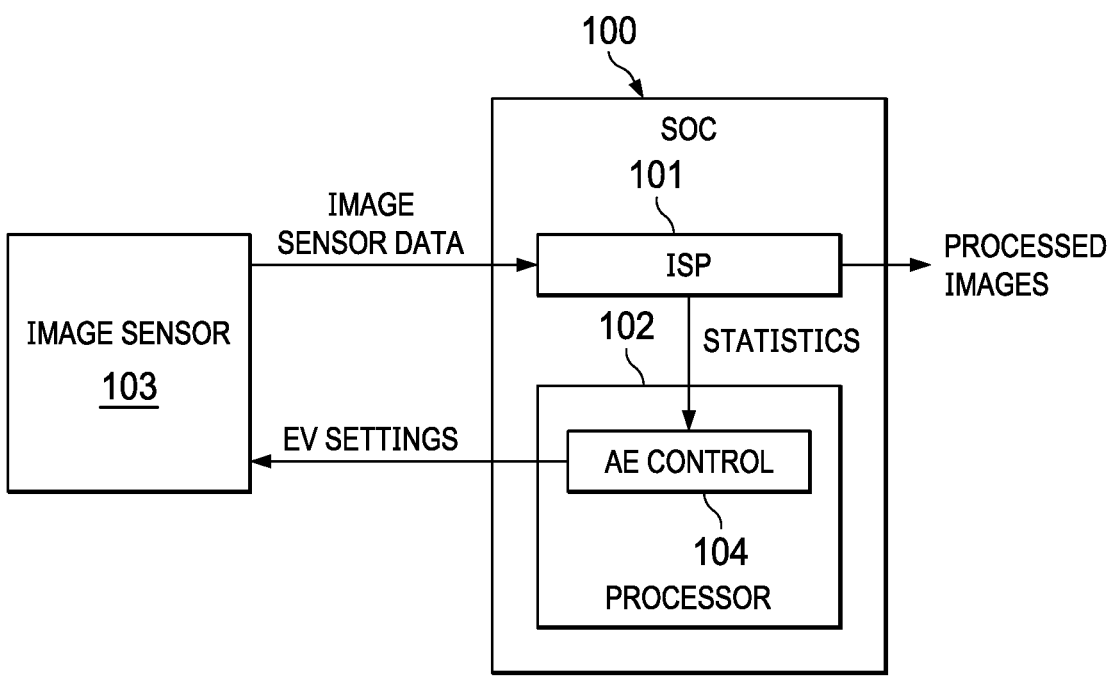
FIG. 1 is a simplified block diagram illustrating an example of automatic exposure (AE) control in an imaging sensor system.

Specific embodiments of the disclosure are described herein in detail with reference to the accompanying figures. Like elements in the various figures are denoted by like reference numerals for consistency.

Embodiments of the disclosure provide for automatic exposure (AE) control of images in an imaging sensor system. In particular, embodiments provide for computing exposure values (EV) to be used to determine AE settings of an imaging sensor. Depending on the particular imaging system, an EV may be a function of the exposure time (ET) (shutter speed) and one or more of the analog gain (AG), the F-number (aperture size), and the digital gain (DG) to be used to capture an image. For example, imaging sensor systems used in automotive applications may not be configured to change the aperture size and therefore EV may be a function of ET and AG. Approaches to computation of EVs described herein are based on target characteristics of an image indicative of exposure settings that yield well exposed images. In some embodiments, the target characteristics that form the basis of the EV computation are target brightness, target percentage of low tone pixels, and target percentage of high tone pixels.

FIG. 1 is a simplified block diagram illustrating an example of AE control in an imaging sensor system in accordance with some embodiments. The imaging sensor system includes a system on a chip (SoC) 100 coupled to an image sensor 103 to receive raw image sensor data. The SoC 100 includes an image signal processor (ISP) 101 and a processor 102 for executing AE control software 104. The ISP 101 includes functionality to receive the raw image sensor data and perform various image processing operations on the raw sensor data to generate processed images. The image processing operations may include decompanding, defective pixel correction (DPC), lens shading correction, spatial noise filtering, brightness and contrast enhancement, demosaicing, and color enhancement. In addition, the ISP 101 is configured to generate statistics from the images for the AE computations and to provide the generated AE statistics to the processor 102. The AE statistics for an image may be a downsampled version of the image in which each pixel in the downsampled image is generated by averaging pixels in the original image.

The AE control software 104 using the AE statistics (e.g., a downsampled image) generated for a current image, referred to as the image at time t herein, to determine an EV for one or more subsequent images to be captured by the image sensor 103. The AE control software 104 computes exposure values (EV) using a cost function based on target characteristics of an image, i.e., target brightness of an image and target percentages (also called target probabilities) of low tone and high tone pixels in an image, indicative of exposure settings that yield well exposed images. More specifically, for each image, the cost function minimizes the normalized deviation of the mean brightness of the image from a target mean brightness, the normalized deviation of the probability of low tone pixels in the image from a target percentage (or target probability) of low tone pixels, and the normalized deviation of the probability of high tone pixels in the image from a target percentage (or target probability) of high tone pixels. Equations for these normalized deviations are provided below and Table 1 provide definitions for the variables in these equations.

The normalized deviation from a target brightness is computed as per $$D_{MB} = \frac{|T_{MB} - I_{MB}(t)|}{B_{range}}.$$

The normalized deviation from a target percentage of low tone pixels is computed as per $$D_{PL}=|T_{PL}-p_L(t)|.$$

The normalized deviation from a target percentage of high tone pixels is computed as per $$D_{PH}=|T_{PH}-p_H(t)|.$$

TABLE 1

| Variable | Definition |
| --- | --- |
| $T_{MB}$ | Target mean brightness |
| $I_{MB}$ (t) | Mean brightness of image I at time t |
| $B_{range}$ | Brightness range |
| $T_{PL}$ | Target probability of low-tone pixels |

4

TABLE 1-continued

| Variable | Definition |
| --- | --- |
| $p_L$ (t) | Probability of low-tone pixels at time t |
| $T_{PH}$ | Target probability of high-tone pixels |
| $p_H$ (t) | Probability of high-tone pixels at time t |

The AE control software computes the cost function as per $$c=\alpha^{-D_{MB}*}\beta^{D_{PL}*}\gamma^{-D_{PH}},$$

where $\alpha$, $\beta$, and $\gamma \geq 1$ are weights provided as parameters to the AE control software 104. The target mean brightness $T_{MB}$, the target probability of low-tone pixels $T_{PL}$, and the target probability of high-tone pixels $T_{PH}$ are also provided as parameters to the AE control software 104. The AE control software 104 computes the brightness range $B_{range}$, the mean brightness at time t IMB(t), the probability of low-tone pixels at time t $p_L(t)$, and the probability of high-tone pixels at time t $p_H(t)$ using the downsampled image. The brightness range $B_{range}$ may be the maximum allowed pixel value in the image, which depends on the pixel bit depth of the image. The mean brightness $I_{MB}(t)$ may be computed as the sum of all the pixels values in the image divided by the number of pixels in the image. The probability of low tone pixels $p_L(t)$ may be computed as the number of pixels in the image below a low tone threshold divided by the total number of pixels in the image. The probability of high tone pixels $p_H(t)$ may be computed as the number of pixels in the image above a high tone threshold divided by the total number of pixels in the image. The low tone threshold and high tone threshold are provided as parameters to the AE control software 104.

In some embodiments, the values of $\alpha$, $\beta$, and $\gamma$ may be chosen based on the impact reaching each target has on achieving a well exposed image. For example, if meeting the target brightness goal is a better measure of a well exposed image than the target percentage of low-tone pixels, then $\alpha > \beta$. In some embodiments, a machine learning approach is used to learn values of $\alpha$, $\beta$, and $\gamma$. Such embodiments are described below.

The AE control software 104 computes an EV for time t as per $$EV(t) = \begin{cases} (c*EV(t-1)) & \text{if } c \geq T_c \\ EV(t-1) & \text{otherwise} \end{cases}$$

where $T_c$ a threshold cost value representing a minimum cost for adjusting the EV. The threshold cost $T_c$ is provided as a parameter to the AE control software 104. The resulting EV(t) is then used to generate exposure settings, e.g., AG and ET, for the image sensor 103.

In some embodiments, the AE control software 104 implements a stability lock that is used to ensure that the EV is not changed based on small or anomalous changes in scene brightness between images. The stability lock determines whether or not the computed value of EV(t) is to be used to determine the exposure settings for the image sensor 103. Table 2 shows pseudo code for the stability lock in accordance with some embodiments. In this pseudo code, the lock state of locked indicates whether the AE computations are locked (not to be used) or unlocked, the lock count is used to ensure that the EV is not change based on a single faulty frame, e.g., an image with a very high brightness as compared to the previous image, Run AE indicates whether or not the computed value of EV(t) is to be used, $y_{curr}$ is the current average scene brightness, and $y_{avg}$ is the average brightness over a user specified number of previous images, and $T_{BD}$ is the maximum allowable brightness deviation from $T_{MB}$.

TABLE 2

```
Run AE = 1
If (locked) and (c < T_c):
    → Run AE = 0
If ( (|y_curr(t - 1) - y_avg(t)| < T_BD) and (c < 2 * T_c) ) or (c < T_c)):
    → lock count + +
Else If (lock count > 0):
    → lock count - -
If (lock count > 3):
    → lock count = 3
    → locked = 1
    → Run AE   = 0
Else If (lock count > 0) and (locked)
    → Run AE = 0
If (Run AE)
    →Perform AE
    → locked = 0
```

Figure 2:
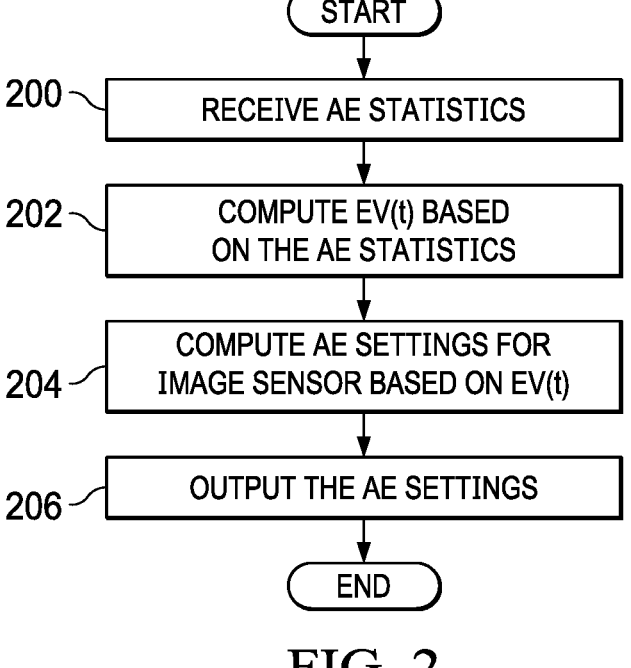
FIG. 2 is a flow diagram of a method for AE control in an imaging sensor system.

FIG. 2 is a flow diagram of a method for automatic exposure (AE) control in an imaging sensor system in accordance with some embodiments. For example purposes, the method is explained in reference to the example imaging sensor system of FIG. 1. The method assumes the AE control software 104 has been initialized with values for the parameters $\alpha$, $\beta$, $\gamma$, $T_c$, $T_{BD}$, $T_{MB}$, $T_{PL}$, and $T_{PH}$.

Initially, statistics for AE (e.g., a downsampled image) as generated for an image captured at time t by the image sensor 103 are received by the AE control software 104. The AE statistics are generated by the ISP 101 and stored in memory for access by the AE control software 103. The AE control software 104 computes 202 an exposure value EV(t) as previously described herein using the AE statistics for the image. Exposure settings are then computed 204 for the image sensor 103 based on the value of EV(t) and output 206 to the image sensor 103. In some embodiments, a stability lock as previously described herein may be executed after EV(t) is computed to determine if the exposure setting for the image sensor 103 are to be computed using the computed EV(t) or if the exposure settings are to be unchanged.

Figure 3:
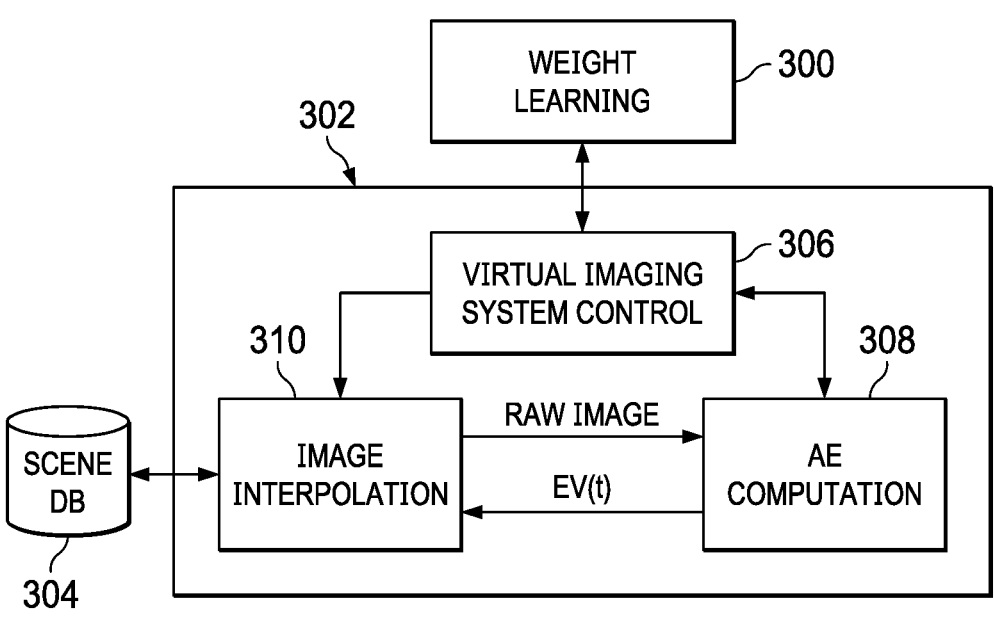
FIG. 3 is a block diagram of an example system for learning values for the AE weights $\alpha$, $\beta$, and $\gamma$.

FIG. 3 is a block diagram of an example system for learning values for the AE weights $\alpha$, $\beta$, and $\gamma$. The system includes a weight learning component 300 coupled to a virtual imaging system 302 configured to execute the above described approach for computing EV(t) and a scene database 304 coupled to the virtual imaging system 302. Values for the weights are learned by executing experiments on the virtual imaging system 302 with various combinations of weight values and starting EVs. Quality metrics are computed based on the results of these experiments and used to determine the weight values.

The scene database 304 stores multiple scenes each including multiple images and corresponding EVs for multiple images. More specifically, for a given scene, the scene database 304 stores multiple images of the scene where each image was captured with a different EV. The range of EVs used to capture the images may be selected to cover the EV range of an imaging sensor but need not include every possible EV. In some embodiments, the images corresponding to the EVs in an EV range are captured sequentially in a small amount of time, e.g., less than one minute. The same EV range may be used for each scene in the scene database 304. For example, for a particular image sensor, the scene database 304 may include fifty scenes with images collected at EV={1, 1.2, 1.4, . . . , 8}.

The virtual imaging system 302 includes a virtual imaging system control component 306, an image interpolation component 310, and an AE computation component 308. The image interpolation component 310 is coupled to the scene database 304 and is configured to provide images to the AE computation component at specified EVs. Inputs to the interpolation component 310 include a scene identifier, e.g., a scene name or number, and an EV. The image interpolation component 310 is configured to search the images in the scene database 304 corresponding to the identified scene for an image captured at the requested EV. If such an image is found, the image is provided to the AE computation component 308.

If such an image is not found, the image interpolation component 310 is configured to interpolate an image corresponding to the requested EV and provide the interpolated image to the AE computation component 308. In some embodiments, the image interpolation component 310 generates the interpolated image using two images from the identified scene that were captured at EVs immediately above and below the requested EV. More specifically, the image interpolation component 310 generates an interpolated image $I_{EV(t)}$ as per $$I_{EV(t)} = \left\{ \left( \frac{EV(t)^+}{EV(t)^+ + EV(t)^-} \right) I_{EV(t)^+} \right\} + \left\{ \left( \frac{EV(t)^-}{EV(t)^+ + EV(t)^-} \right) I_{EV(t)^-} \right\}$$

where EV(t) is the requested EV, $I_{EV(t)}^+$ is the scene image from the scene database 304 with the closest EV larger than EV(t), $EV(t)^+$ is the EV of $I_{EV(t)}^+$, $I_{EV(t)}^-$ is the scene image from the scene database 304 with the closest EV smaller than EV(t), and $EV(t)^-$ is the EV of $I_{EV(t)}^-$.

The AE computation component 308 is configured to compute an EV based on the image received from the image interpolation component 308. The EV is computed as per $$EV(t) = \begin{cases} (c * EV(t-1)) & \text{if } c \geq T_c \\ EV(t-1) & \text{otherwise} \end{cases}$$

as previously described herein. The AE computation component 308 computes the brightness range $B_{range}$, the mean brightness at time t $I_{MB}(t)$, the probability of low-tone pixels and the probability of high-tone pixels at time t $p_H(t)$ based on the image received from the image interpolation component 310. The target mean brightness $T_{MB}$, the target probability of low-tone pixels $T_{PL}$, the target probability of high-tone pixels $T_{PH}$, the threshold cost $T_c$, and values for the weights $\alpha$, $\beta$, $\gamma$ are input parameters to the AE computation component 308. In some embodiments, the AE computation component 308 is also configured to implement a stability lock as previously described herein.

The virtual imaging system control component 306 is configured to control the operation of the virtual imaging system 302. Inputs to the virtual imaging system control component 306 include the parameters for the image interpolation component 310 and the AE computation component 308 which include those previously mentioned herein as well as an initial EV for the image interpolation component 310, a scene identifier, and a number of time steps to execute the virtual imaging system 302. The virtual imaging system control component 306 includes functionality to cause the image interpolation component 310 and AE computation component 308 to execute for the specified number of time steps. A time step includes generation of an image at the requested EV (either the initial one or one output by the AE computation component 308 in the previous time step) by the image interpolation component 303 and computation of an EV based on the generated image by the AE computation component 308. The virtual imaging system control component 306 is further configured to capture the EV output by the AE computation component 308 after each time step and to provide the captured EVs to the weight learning component 300.

The weight learning component 300 is configured to cause the virtual imaging system 302 to execute experiments using candidate values of $\alpha$, $\beta$, $\gamma$ and various starting EVs and to compute quality metrics for each combination of candidate values of $\alpha$, $\beta$, $\gamma$. The goal is to identify values for $\alpha$, $\beta$, $\gamma$ that result in EVs within a goal range of EVs identified as producing well exposed images in the scenes in the scene database 304. The goal range of EVs may be determined, for example, by having an expert view all the images in the scene database 304 and identify the images that have good exposure in the opinion of the expert. The EVs for the identified images can then be used to set the goal range of EVs. In some embodiments, multiple experts may be used and the goal range of EVs determined from the opinions of the multiple experts.

The weight learning component 300 is configured to receive a goal range of EVs, a range of candidate weight values for $\alpha$, $\beta$, $\gamma$ to be tried, a set of starting EVs, and a number of time steps from a user as well as values for $T_{MB}$, $T_{PL}$, $T_{PH}$, $T_c$, $T_{BD}$, and the low and high tone thresholds for the AE computation component 308. The weight learning component 300 causes the virtual imaging system 302 to execute an experiment for the number of time steps for each scene in the scene database 304 for each possible combination of $\alpha$, $\beta$, $\gamma$ from the range of candidate weight values and starting EV and receives from the virtual imaging system 302 a set of EVs generated by the AE computation component 308 for each experiment. A combination of values of $\alpha$, $\beta$, $\gamma$ selected from the range of candidate weight values may be referred to as a candidate set of weight values herein. The set of EVs includes one EV value for each time step. More specifically, the weight learning component 300 receives a set of EVs for each experiment described by a 5-tuple ($\alpha$, $\beta$, $\gamma$, S, EV(0)) where $\alpha$, $\beta$, $\gamma$ are the candidate weight values used for the experiment, S is the scene identifier for the experiment, and EV(0) is the starting EV for the experiment.

For example, the range of candidate weight values may be [1, 2, 3], the set of starting EVs may be [1, 4, 8], and the number of time steps may be 10. The possible combinations of $\alpha$, $\beta$, $\gamma$, i.e., the candidate sets of weight values, are [1, 1, 1], [1, 1, 2], [1, 1, 3], [1, 2, 1], [1, 2, 2], [1, 2, 3], . . . [3, 3, 3]. An experiment is executed for each of these candidate sets of weight values with each starting EV for each scene. For example, experiments are executed with $\alpha$, $\beta$, $\gamma$=[1, 1, 1] and a starting EV of 1 for each scene in the database. Then, experiments are executed with $\alpha$, $\beta$, $\gamma$=[1, 1, 1] and a starting EV of 4 for each scene in the database. Then, experiments are executed with $\alpha$, $\beta$, $\gamma$=[1, 1, 1] and a starting EV of 8 for each scene in the database. This process is repeated for each possible combination of $\alpha$, $\beta$, $\gamma$ in the range of candidate weight values.

After all the experiments are executed, the weight learning component 300 will have a set of ten EVs for each experiment. The weight learning component 300 is configured to compute quality metrics based on the sets of EVs generated by each experiment. For example, in some embodiments, the quality metrics are computed for each possible candidate set of weight values for $\alpha$, $\beta$, $\gamma$, and are the percentage of experiments using a candidate set of weight values that converged to the goal EV range, the probability of convergence using the candidate set of weight values, and the average convergence time using the candidate set of weight values. An experiment for a candidate set of weight values converges if the EVs generated for a scene using the candidate set of weight values achieve an EV value within the goal range of EV values and stay within the goal range for consecutive time steps.

For example, assume the goal range of EV values is [2,3], the starting EV value is 8, the number of time steps is ten, and the resulting EVs for an experiment for a scene are 8, 6, 4, 2, 1, 2, 2, 2, 2, 2. The experiment converged to an EV within the goal range at time step 6 and remained converged for the final four time steps. The convergence time for a combination of $\alpha$, $\beta$, $\gamma$ is the number of time steps the AE computation component 308 is called until the EV is within the goal range and convergence occurs in the remaining time steps of an experiment multiplied by the frame rate of the imaging sensor used to capture the images in the scene data base 304. Continuing the previous example, convergence began at time step 6, so the convergence time step is 6 and the convergence time is 6 times the frame rate.

Figure 4:
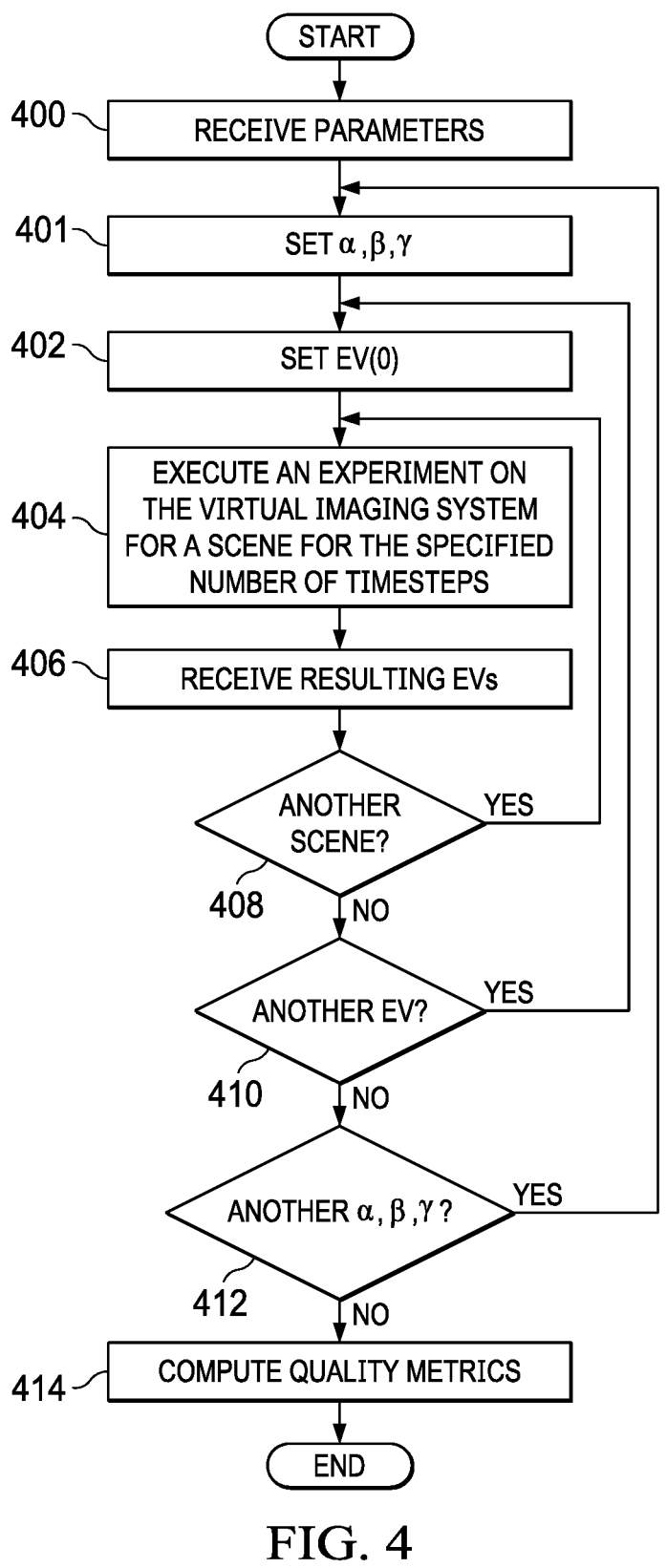
FIG. 4 is a flow diagram of a method for learning values for the AE weights $\alpha$, $\beta$, and $\gamma$.

FIG. 4 is a flow diagram of a method for learning values for the AE weights $\alpha$, $\beta$, and $\gamma$ in accordance with some embodiments. For example purposes, the method is explained in reference to the example system of FIG. 3. The method assumes that one or more experts have viewed the images in the scene database 304 and a goal range of EVs has been determined. Initially, the weight learning component 300 receives 400 parameters for learning the weight values including a range of candidate weight values for $\alpha$, $\beta$, $\gamma$ to be tried, a set of starting EVs, a number of time steps n for each experiment as well as values for $T_{MB}$, $T_{PL}$, $T_{PH}$, $T_c$, $T_{BD}$, and the low and high tone thresholds and initializes the virtual imaging system 302 with the values for $T_{MB}$, $T_{PL}$, $T_{PH}$, $T_c$, $T_{BD}$, and the low and high tone thresholds.

The weight learning component 300 sets 401 values of $\alpha$, $\beta$, $\gamma$ for the virtual imaging system 302 selected from the range of candidate weight values and sets 402 a value for the starting EV, EV(0), selected from the set of starting EVs. The weight learning component 300 then causes an experiment to be executed on the virtual imaging system 302 for a scene in the scene database 304 for the specified number of time steps and receives 406 the resulting EVs from the virtual imaging system 302. If there is another scene 408 in the scene database for which an experiment has not been executed for the current values of $\alpha$, $\beta$, $\gamma$ and EV(0), the weight learning component 300 causes an experiment to be executed on the virtual imaging system 302 for another scene in the scene database 304 using the current values of $\alpha$, $\beta$, $\gamma$ and EV(0).

Once an experiment has been performed for all scenes 408 in the scene database 304 with the current values of $\alpha$, $\beta$, $\gamma$ and EV(0), if there is another starting EV 410 in the set of starting EVs that has not been used in experiments with the current values of $\alpha$, $\beta$, $\gamma$, then the weight learning component 300 sets 402 EV(0) to the next starting EV and causes an experiment to be executed on the virtual imaging system 302 for each scene 408 in the scene database 304 using the current values of $\alpha$, $\beta$, $\gamma$ and EV(0) and receives 406 the resulting EVs.

Once an experiment has been executed for all scenes 408 in the scene database 304 with the current values of $\alpha$, $\beta$, $\gamma$ and all starting EVs 410 in the set of starting EVs, if there is another candidate set 412 of values of α, β, γ in the range of candidate weight values for which experiments have not been executed, then the weight learning component 300 sets 401 the values of α, β, γ to another set of values in the range of weight values and causes an experiment to be executed 404 on the virtual imaging system 302 for each scene 408 for each starting EV 410 in the set of starting EVs with the current values of α, β, γ and receives 406 the resulting EVs.

Once an experiment has been executed for all scenes 408 in the scene database 304 for all combinations of values of α, β, γ in the range of candidate weight values and values of EV(0) in the set of starting EVs, the weight learning component 300 uses the EVs from each experiment to compute quality metrics for each combination of values of α, β, γ, i.e., each candidate set of weight values. Computation of example quality metrics is previously described herein. The user may then use these quality metrics to select a combination of values of α, β, γ to be used for automatic exposure control in an imaging sensor system.

Figure 5:
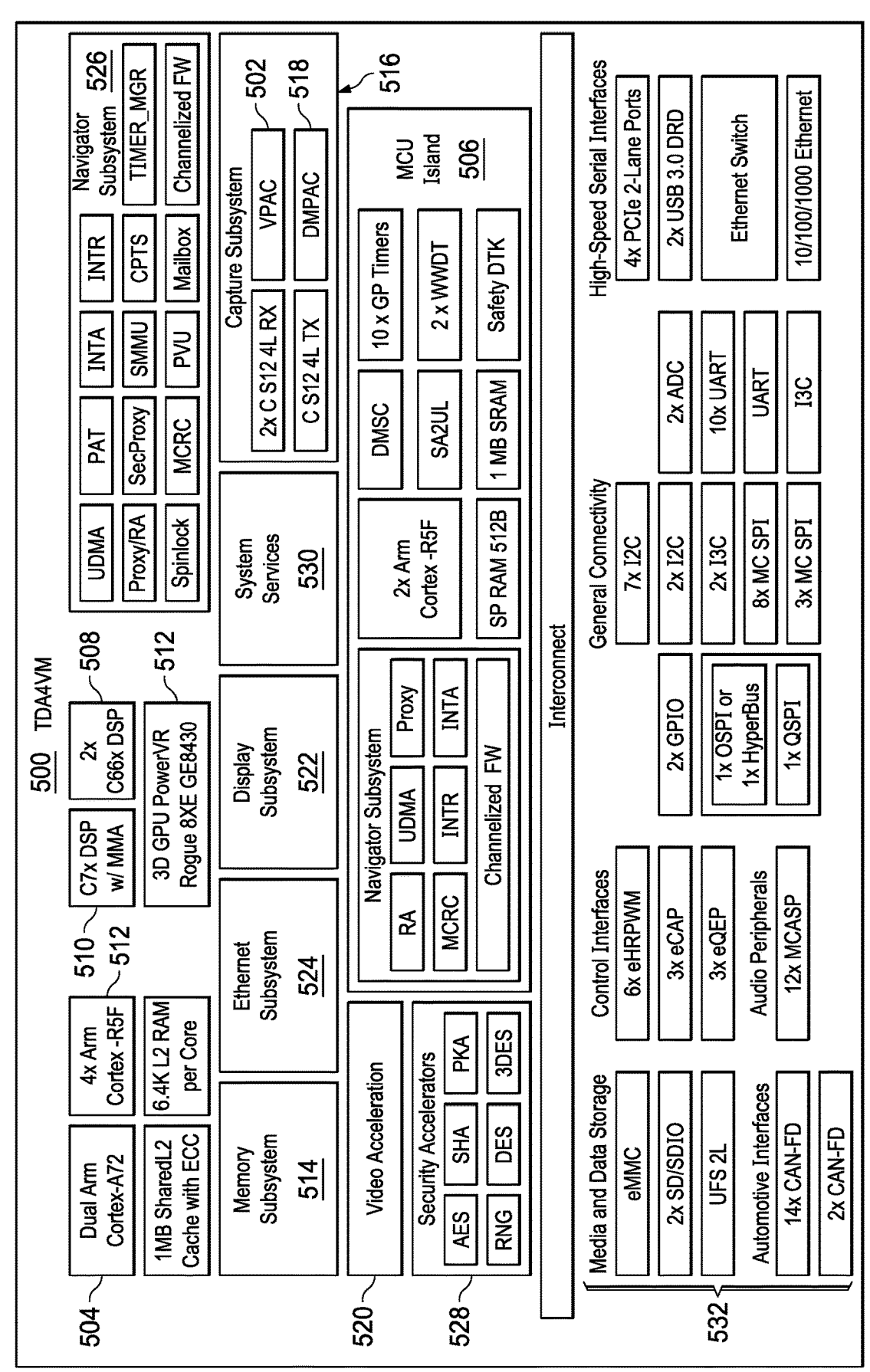
FIG. 5 is a high level block diagram of an example multiprocessor system on a chip (SoC)

FIG. 5 is a high level block diagram of an example multiprocessor system-on-a-chip (SoC) 500 that may be configured to perform embodiments of automatic exposure (AE) control as described herein. In particular, the example SoC 500 is an embodiment of the TDA4VM SoC available from Texas Instruments, Inc. A high level description of the components of the SoC 500 is provided herein. More detailed descriptions of example components may be found in "TDA4VM Jacinto™ Automotive Processors for ADAS and Autonomous Vehicles Silicon Revisions 1.0 and 1.1," Texas Instruments, SPRSP36J, February, 2019, revised August, 2021, pp. 1-323, which is incorporated by reference herein.

The SoC 500 includes numerous subsystems across different domains such as one dual-core 64-bit Arm® Cortex®-A72 microprocessor subsystem 504, a microcontroller unit (MCU) island 506, based on two dual-core Arm® Cortex®-R5F MCUs, four additional dual-core Arm® Cortex®-R5F MCUs 512 in the main domain, two C66x floating point digital signal processors (DSPs) 508, one C71x floating point, vector DSP 510, that includes a deep-learning matrix multiply accelerator (MMA), and 3D graphics processing unit (GPU) 512. The SoC 500 further includes a memory subsystem 514 including up to 8 MB of on-chip static random access memory (SRAM), an internal DMA engine, a general purpose memory controller (GPMC), and an external memory interface (EMIF) module (EMIF). In addition, the SoC 500 includes a capture subsystem 516 with two camera streaming interfaces, a vision processing accelerator (VPAC) 502 including one or more image signal processors (ISPs), a depth and motion processing accelerator (DMPAC) 518, and a video acceleration module 520. The SoC 500 also includes a display subsystem 522, an ethernet subsystem 524, a navigator subsystem 526, various security accelerators 528, support for system services 530, and a variety of other interfaces 532.

Software instructions implementing AE control software as described herein may be stored in the memory subsystem 514 (e.g., a computer readable medium) and may execute on one or more programmable processors of the SOC 500, e.g., the DSP 510. Further, the one or more ISPs in the VPAC 502 may be, for example, embodiments of the ISP 101 of FIG. 1.

Figure 6:
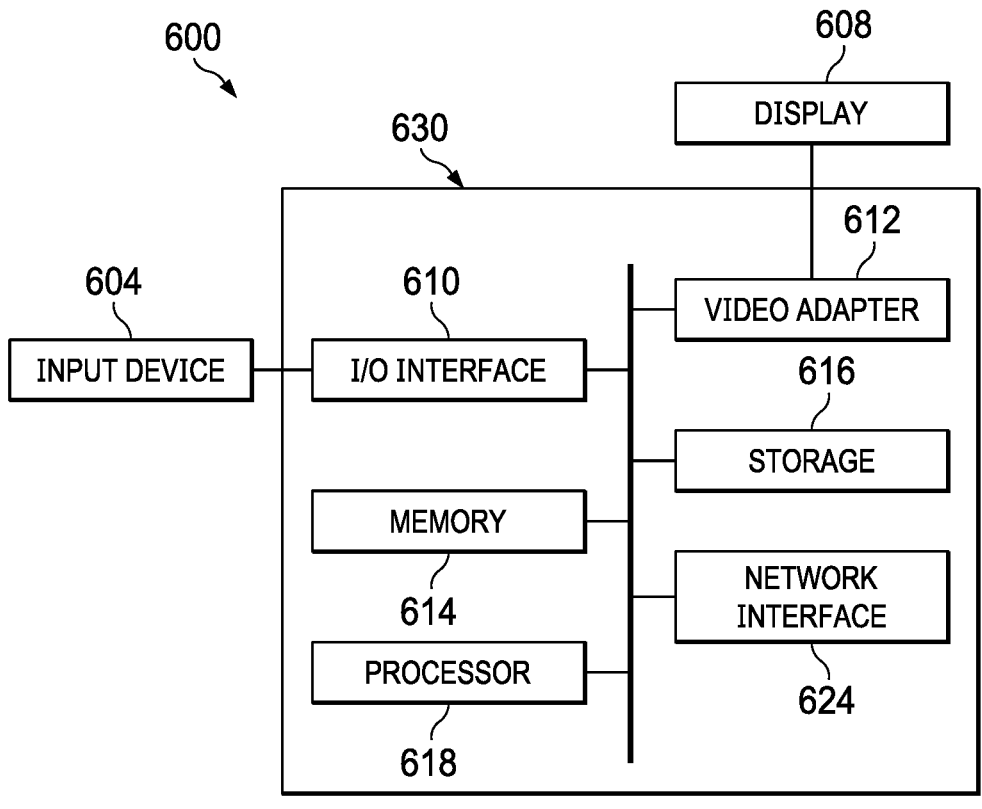
FIG. 6 is a simplified block diagram of a computer system.

FIG. 6 is a simplified block diagram of a computer system 600 that may be used to execute a system for learning values for the AE weights α, β, and γ as previously described herein. The computer system 600 includes a processing unit

630 equipped with one or more input devices 604 (e.g., a mouse, a keyboard, or the like), and one or more output devices, such as a display 608, or the like. In some embodiments, the display 608 may be touch screen, thus allowing the display 608 to also function as an input device. The display may be any suitable visual display unit such as, for example, a computer monitor, an LED, LCD, or plasma display, a television, a high definition television, or a combination thereof.

The processing unit 630 includes a central processing unit (CPU) 618, memory 614, a storage device 616, a video adapter 612, an I/O interface 610, a video decoder 622, and a network interface 624 connected to a bus. The bus may be one or more of any type of several bus architectures including a memory bus or memory controller, a peripheral bus, video bus, or the like.

The CPU 618 may be any suitable type and suitable combination of electronic data processors. For example, the CPU 618 may include one or more processors from Intel Corp. or Advanced Micro Devices, Inc., one or more Reduced Instruction Set Computers (RISC), one or more Application-Specific Integrated Circuits (ASIC), one or more digital signal processors (DSP), or the like. The memory 614 may be any type of system memory such as static random access memory (SRAM), dynamic random access memory (DRAM), synchronous DRAM (SDRAM), read-only memory (ROM), flash memory, a combination thereof, or the like. Further, the memory 614 may include ROM for use at boot-up, and DRAM for data storage for use while executing programs.

The storage device 616 (e.g., a computer readable medium) may include any type of storage device configured to store data, programs, and other information and to make the data, programs, and other information accessible via the bus. The storage device 616 may be, for example, one or more of a hard disk drive, a magnetic disk drive, an optical disk drive, or the like. Software instructions implementing a system for learning values for the AE weights α, β, and γ as described herein may be stored on the storage device 616. The scene database may also be stored on the storage device 616 or may be accessed via the network interface 624. The software instructions may be initially stored in a computer-readable medium such as a compact disc (CD), a diskette, a tape, a file, memory, or any other computer readable storage device and loaded and executed by the CPU 618. In some cases, the software instructions may also be sold in a computer program product, which includes the computer-readable medium and packaging materials for the computer-readable medium. In some cases, the software instructions may be distributed to the computer system 600 via removable computer readable media (e.g., floppy disk, optical disk, flash memory, USB key), via a transmission path from computer readable media on another computer system (e.g., a server), etc.

The video adapter 612 and the I/O interface 610 provide interfaces to couple external input and output devices to the processing unit 630. As illustrated in FIG. 6, examples of input and output devices include the display 608 coupled to the video adapter 612 and the mouse/keyboard 604 coupled to the I/O interface 610.

The network interface 624 allows the processing unit 630 to communicate with remote units via a network. The network interface 624 may provide an interface for a wired link, such as an Ethernet cable or the like, and/or a wireless link via, for example, a local area network (LAN), a wide area network (WAN) such as the Internet, a cellular network, any other similar type of network and/or any combination thereof.

Other Embodiments

While the disclosure has been described with respect to a limited number of embodiments, those skilled in the art, having benefit of this disclosure, will appreciate that other embodiments can be devised which do not depart from the scope disclosed herein.

For example, embodiments are described herein in reference to a particular technique for interpolating images to generate an image with a desired EV. In other embodiments, other techniques for interpolation may be used.

In another example, embodiments are described herein in which a particular cost function is used for AE control in an imaging sensor system. In other embodiments, other cost functions representative of achieving well exposed images as viewed by one or more experts may be used.

In another example, embodiments are described herein in which a particular approach to learning weight values for a cost function for AE control is used. In other embodiments, other learning techniques may be used.

In another example, embodiments are described herein in reference to an example stability lock. In other embodiments, the stability lock may not be used or other approaches for implementing the stability lock may be used.

In another example, embodiments are described herein in which AE statistics may be a downsampled image. In other embodiments, different or additional statistics may be available for AE, e.g., an image histogram.

It is therefore contemplated that the appended claims will cover any such modifications of the embodiments as fall within the true scope of the disclosure.

What is claimed is:

1. A non-transitory computer readable medium storing software instructions that, when executed by at least one processor, cause the at least one processor to:

receive statistics associated with automatic exposure (AE) control of an imaging sensor system;

determine an exposure value using a cost function based on the statistics, wherein the cost function includes one or more weights predetermined using a learning process based on a plurality of images corresponding to different exposure values; and determine AE settings for the imaging sensor system based on the determined exposure value.

2. The non-transitory computer readable medium of claim 1, wherein the software instructions that cause the at least one processor to determine the exposure value cause the at least one processor to determine the exposure value using the cost function based on target characteristics in addition to the statistics, and wherein the target characteristics comprise one or more of a target mean brightness of an image, a target probability of low tone pixels in an image, and a target probability of high tone pixels in an image.

3. The non-transitory computer readable medium of claim 2, wherein the cost function minimizes one or more of a normalized deviation of a mean brightness of the image from the target mean brightness, a normalized deviation of a probability of low tone pixels in the image from the target probability of low tone pixels, and a normalized deviation of a probability of high tone pixels in the image from the target probability of high tone pixels.

4. The non-transitory computer readable medium of claim 3, wherein the cost function is given by $$c = \alpha^{-D_{MB}} * \beta^{D_{PL}} * \gamma^{-D_{PH}}$$

wherein $D_{MB}$ is the normalized deviation of the mean brightness of the image from the target mean brightness, $D_{PL}$ is the normalized deviation of the probability of low tone pixels in the image from the target probability of low tone pixels, $D_{PH}$ is the normalized deviation of the probability of high tone pixels in the image from the target probability of high tone pixels, and $\alpha$, $\beta$, $\gamma$ are the weights of the cost function.

5. The non-transitory computer readable medium of claim 4, wherein the plurality of images is stored in a scene database storing a plurality of scenes, wherein each scene corresponds to a subset of the plurality of images, wherein each image in the subset of the plurality of images for a scene corresponds to a different exposure value, and values of $\alpha$, $\beta$, $\gamma$ are predetermined using the learning process further based on a goal range of exposure values in addition to the plurality of images.

6. The non-transitory computer readable medium of claim 1, wherein the software instructions that cause the at least one processor to determine the exposure value cause the at least one processor to determine an exposure value at a current time t as a product of the cost function and an exposure value at a prior time (t−1) based on that the cost function is greater than a minimum cost.

7. The non-transitory computer readable medium of claim 1, wherein the software instructions that cause the at least one processor to determine the exposure value cause the at least one processor to use a stability lock to determine whether the exposure value is to be used to compute the AE settings.

8. A system, comprising:

memory configured to store software instructions; and at least one processor configured to execute the software instructions to:

receive parameters of a cost function associated with automatic exposure (AE) control of an imaging sensor system, wherein the parameters comprise a range of candidate weight values and a set of starting exposure values;

perform an iterative operation to determine one or more weights of the cost function based on differing combinations of candidate sets of weight values selected from the range of candidate weight values and starting exposure values selected from the set of starting exposure values, wherein an individual step of the iterative operation comprises determining exposure values for a plurality of images captured by the imaging sensor system based on a candidate set of weight values and a starting exposure value; and determine a quality metric for each candidate set of weight values based on the exposure values determined from the iterative operation.

9. The system of claim 8, wherein the quality metric comprises at least one of a percentage of steps of the iterative operation, a probability of convergence, and average convergence time.

10. The system of claim 8, wherein to determine the exposure values, the at least one processor is configured to execute the software instructions to determine the exposure values based on target characteristics of an image.

11. The system of claim 10, wherein the target characteristics comprise one or more of a target mean brightness of an image, a target probability of low tone pixels in an image, and a target probability of high tone pixels in an image.

12. The system of claim 11, wherein the cost function minimizes one or more of a normalized deviation of a mean brightness of an image from the target mean brightness, a normalized deviation of a probability of low tone pixels in the image from the target probability of low tone pixels, and a normalized deviation of a probability of high tone pixels in the image from the target probability of high tone pixels.

13. The system of claim 8, wherein to determine the exposure values, the at least one processor is configured to execute the software instructions to:

determine a first exposure value based on the candidate set of weight values, the starting exposure value, and a first image captured with the starting exposure value; and determine a second exposure value based on the candidate set of weight values, the first exposure value, and a second image captured with the first exposure value.

14. A method, comprising:

receiving parameters of a cost function associated with automatic exposure (AE) control of an imaging sensor system, wherein the parameters comprises a range of candidate weight values and a set of starting exposure values;

performing an iterative operation to determine one or more weights of the cost function based on differing combinations of candidate sets of weight values selected from the range of candidate weight values and starting exposure values selected from the set of starting exposure values, wherein an individual step of the iterative operation comprises determining exposure values for a plurality of images captured by the imaging sensor system based on a candidate set of weight values and a starting exposure value; and determining a quality metric for each candidate set of weight values based on the exposure values determined from the iterative operation.

15. The method of claim 14, wherein the quality metric comprises at least one of a percentage of steps of the iterative operation, a probability of convergence, and average convergence time.

16. The method of claim 14, wherein determining the exposure values comprises determining the exposure values based on target characteristics of an image.

17. The method of claim 16, wherein the target characteristics comprise one or more of a target mean brightness of an image, a target probability of low tone pixels in an image, and a target probability of high tone pixels in an image.

18. The method of claim 17, wherein the cost function minimizes one or more of a normalized deviation of a mean brightness of an image from the target mean brightness, a normalized deviation of a probability of low tone pixels in the image from the target probability of low tone pixels, and a normalized deviation of a probability of high tone pixels in the image from the target probability of high tone pixels.

19. The method of claim 18, wherein the cost function is given by $$c = \alpha^{-D_{MB}} * \beta^{D_{PL}} * \gamma^{-D_{PH}}$$

wherein $D_{MB}$ is the normalized deviation of the mean brightness of the image from the target mean brightness, $D_{PL}$ is the normalized deviation of the probability of low tone pixels in the image from the target probability of low tone pixels, $D_{PH}$ is the normalized deviation of the probability of high tone pixels in the image from the target probability of high tone pixels, and $\alpha$, $\beta$, $\gamma$ are weight values in the candidate set of weight values.

20. The method of claim 14, wherein determining the exposure values further comprises:

determining a first exposure value based on the candidate set of weight values, the starting exposure value, and a first image captured with the starting exposure value; and determining a second exposure value based on the candidate set of weight values, the first exposure value, and a second image captured with the first exposure value.

* * * * *